(12) United States Patent
Viladomiu i Guarro et al.

(10) Patent No.: US 7,735,808 B2
(45) Date of Patent: Jun. 15, 2010

(54) METHOD AND SYSTEM FOR PERFORMING OPERATIONS ON A WIND TURBINE

(75) Inventors: Pere Viladomiu i Guarro, Barcelona (ES); Sebastian Valero Lafuente, Barcelona (ES)

(73) Assignee: Ecotecnia S.Coop.C.L., Barcelona (ES)

( * ) Notice: Subject to any disclaimer, the term of this patent is extended or adjusted under 35 U.S.C. 154(b) by 632 days.

(21) Appl. No.: 11/638,863

(22) Filed: Dec. 14, 2006

(65) Prior Publication Data

US 2007/0200103 A1    Aug. 30, 2007

(51) Int. Cl.
*B66D 1/26* (2006.01)
(52) U.S. Cl. ............................. 254/278; 416/142
(58) Field of Classification Search .............. 254/278, 254/279, 329; 416/142
See application file for complete search history.

(56) References Cited

U.S. PATENT DOCUMENTS 6,364,609 B1 *   4/2002   Barnes ................. 416/142
2003/0183594 A1 * 10/2003  Torres Martinez .......... 212/196
2004/0169376 A1 *  9/2004  Ruer et al. ..................... 290/55
2006/0175465 A1 *  8/2006  Teichert ....................... 244/33
2007/0151194 A1 *  7/2007  Livingston et al. ....... 52/651.05
2008/0078128 A1 *  4/2008  Livingston et al. ............. 52/40
2008/0257844 A1 * 10/2008  Llorente Gonzalez et al. .... 212/179

FOREIGN PATENT DOCUMENTS

| EP | 1577550 A2 | 9/2005 |
|---|---|---|
| WO | WO 02/34664 A1 | 5/2002 |
| WO | WO 2006/013222 A1 | 2/2006 |

* cited by examiner

*Primary Examiner*—Emmanuel M Marcelo
(74) *Attorney, Agent, or Firm*—Shook, Hardy & Bacon, L.L.P.

(57) ABSTRACT

A wind turbine has a nacelle frame and a first hoist substantially permanently mounted on the frame. The method comprises the processes of hoisting a second, more powerful hoist and crane on the frame with the first hoist; removably mounting the second hoist and the crane on the nacelle frame; hoisting a winch using the second hoist and the crane on the frame, and removably mounting the winch on said frame; performing operations involving handling heavy parts employing said winch; and removing and lowering said winch, crane, and second hoist from the frame.

18 Claims, 9 Drawing Sheets

METHOD AND SYSTEM FOR PERFORMING OPERATIONS ON A WIND TURBINE

CROSS-REFERENCE TO RELATED APPLICATIONS

This application claims priority to European Patent Application No. EP06110461 filed Feb. 27, 2006.

FIELD OF THE INVENTION

The present invention relates to a method and a system for performing operations on a wind turbine that involve handling heavy parts therein, particularly for hoisting and lowering heavy parts for replacement or repair.

A nacelle frame assembly is further provided including a nacelle frame having a first hoist substantially permanently mounted thereon.

BACKGROUND OF THE INVENTION

Heavy parts in a wind turbine, such as a generator, a gearbox, or a transformer, are typically handled by terrestrial and marine cranes. Such cranes are large and bulky, so that they are not sufficiently efficient for lowering the parts from the nacelle frame of the wind turbine and hoisting them back to the nacelle frame. Such cranes are expensive so that only a small number of the cranes are available for each wind turbine having parts to be handled. As a consequence, transportation of the cranes to the site where the wind turbine is operating is usually required with the resulting added cost of transportation apart from crane renting.

Attempts for overcoming such problems have been proposed consisting in providing a crane on the nacelle frame. The crane mounted on the frame, however, is difficult to be secured thereto and to become balanced when handling a heavy part of the wind turbine, such as the generator.

Other solutions, such as that in EP1577550, have been proposed in which a winch is provided on the nacelle frame of the wind turbine. In the foregoing patent, a freely supported winch is provided on a carriage in a nacelle frame for lowering heavy parts from and raising them to the wind turbine by means of a cable. The winch used for this purpose is capital intensive since it must be quite heavy and cumbersome for withstanding the high loads in use.

International Patent Publication No. WO 02/34664 describes a solution in which a permanently mounted small, relatively inexpensive crane is used to lift a larger temporary crane that is used for heavy lifting, and International Patent Publication No. 2006/01322 describes a solution in which a self-raising crane is used. Neither of these solutions have been widely adopted because, although they solve the cost issue to some degree, they lose the flexibility of the prior art terrestrial and marine cranes. That is, they are able to effectively handle only the heavy objects that are located close to the crane position, and their position cannot easily be changed.

Thus, there remains a need for a system for handling heavy parts of wind turbines that is cost effective and, at the same time, retains the flexibility of the prior art large terrestrial and marine cranes.

BRIEF SUMMARY OF THE INVENTION

The present invention provides a method for performing operations on a wind turbine that involve handling the heavy parts on the wind turbine. There is further provided a system including a hoist and a winch suitable for carrying out the method. A nacelle frame assembly is also provided for a wind turbine according to the invention.

As noted above, the wind turbine comprises a nacelle frame and a first hoist substantially permanently mounted on the nacelle frame. Here, "substantially permanently" means the ordinary meaning of "permanently mounted" in the art. That is, it recognizes that in this universe nothing is permanent. Generally, this means it is welded, screwed, or bolted to the nacelle frame with fasteners that require tools and substantial effort to remove. This first hoist is lightweight, and it can raise parts of the order of 1,000 Kg.

The method of the invention comprises the processes of hoisting a second hoist on the nacelle frame by using the first hoist. This second hoist is more powerful than the first hoist, such as, for example, being capable of raising parts on the order of 9,000 Kg. According to one aspect of the invention, the first hoist or the second hoist, or both, is a power hoist. "Power hoist" as used herein is any of several devices which employ a system of pulleys and chains, ropes or wires, etc. arranged to gain mechanical advantage for hoisting and pulling parts. Power hoists may be, for example, hydraulic or electric chain hoists, wire rope hoists, etc.

Subsequent processes are performed according to the method of the invention that comprise removably mounting the second hoist on the nacelle frame, then performing operations that involve handling heavy parts, employing the second hoist, and removing from the nacelle frame the second hoist and lowering it with the first hoist.

According to one embodiment of the method of the invention, a further process is carried out before removing the second hoist from the nacelle frame. This process preferably comprises hoisting a crane and removably mounting the crane on the nacelle frame of the wind turbine. Specifically, the crane is mounted on the nacelle frame at a rear portion thereof, opposite the portion of the frame where the wind blades of the generator are arranged.

This crane is arranged to cooperate with the second hoist, and they are used for raising and lowering a winch in a further process of the procedure of the invention. In some embodiments, the winch is provided with a coupling structure for attachment to the nacelle frame.

The winch subsequently is removably mounted on the nacelle frame of the wind turbine, particularly at the rear portion thereof. "Winch" as used herein refers to a device having a smooth or grooved winding drum carrying one or more chains, cables, or ropes rolled up therein in one or more wraps. The invention makes particular use of a powered grooved drum carrying a cable in one wrap.

In a further process of the invention, the winch is movable, and preferably is mounted on one or more wheels and/or one or more rails provided on the nacelle frame so that it is allowed to be displaced along the frame. Preferably, the winch is mounted on a four-wheeled birail running trolley, although it is contemplated that a monorail, one or more wheels without rails, or other suitable movement assembly may be used. Winch displacement is carried out until it becomes substantially above one opening formed on the lower portion of the nacelle frame. The heavy part then can be lowered therefrom by the winch so that a new or repaired part is then hoisted again back to the nacelle frame by the winch. When the new or repaired part has been fitted in the wind turbine, the winch, the crane, and the second hoist are disassembled and lowered from the nacelle frame.

The invention further provides a system for performing operations on a wind turbine that involve handling heavy parts. The wind turbine comprises a nacelle frame and a first hoist substantially permanently mounted on the nacelle frame, a second hoist intended to be hoisted on the nacelle frame by the first hoist, and a winch intended to be hoisted on the nacelle frame by the second hoist and appropriate for handling heavy parts of the wind turbine.

According to the invention, there is further provided a nacelle frame assembly for a wind turbine, the assembly comprising a nacelle frame and a first hoist substantially permanently mounted on the nacelle frame, characterized in that it further comprises a second hoist which is appropriate for being hoisted and temporarily mounted on the nacelle frame for performing operations that involve handling heavy parts when the nacelle frame is arranged on a wind turbine.

The nacelle frame assembly may comprise a winch appropriate for being hoisted and temporarily mounted on the nacelle frame for performing operations that involve handling heavy parts when the nacelle frame is arranged on a wind turbine.

The invention provides a method for performing operations on a wind turbine that involve handling heavy parts, the generator comprising a nacelle frame and a first hoist substantially permanently mounted on the nacelle frame, characterized in that it comprises the processes of: hoisting a second hoist on the nacelle frame by means of the first hoist, the second hoist being more powerful than the first hoist; removably mounting the second hoist on the nacelle frame; performing operations that involve handling heavy parts, employing the second hoist; and removing from the nacelle frame the second hoist and lowering it with the first hoist. Preferably, the method further comprises hoisting a crane and removably mounting the crane on the nacelle frame. Preferably, the method further comprises hoisting a winch on the nacelle frame, and removably mounting the winch on the nacelle frame. Preferably, the hoisting a winch comprises hoisting the winch utilizing the crane and the second hoist. Preferably, the method further comprises moving the first hoist along the nacelle frame. Preferably, the moving the first hoist comprises moving on one or more wheels or one or more rails. Preferably, the winch is hoisted on the nacelle frame together with a coupling structure for mounting the winch to the nacelle frame. Preferably, the method further comprises moving the winch along the nacelle frame. Preferably, the moving the winch comprises moving on one or more wheels or one or more rails. Preferably, the method further comprises using the winch for handling heavy parts of the wind turbine. Preferably, the method further comprises removing and lowering the winch from the nacelle frame. Preferably, the method preferably comprises removing and lowering the crane from the nacelle frame.

The invention also provides a method for performing operations on a wind turbine that involve handling heavy parts, the wind turbine comprising a nacelle frame and a first hoist permanently mounted on the nacelle frame, the method comprising: lifting a second hoist on the nacelle frame using the first hoist, the second hoist being more powerful than the first hoist; removably mounting the second hoist on the nacelle frame; hoisting a cable winch on the nacelle frame by the second hoist; removably mounting the winch on the nacelle frame; performing operations that involve handling heavy parts employing the winch; removing and lowering the winch from the nacelle frame; and removing from the nacelle frame the second hoist and lowering it using the first hoisting. Preferably, the method comprises further moving at least one of the first hoist and the winch on one or more wheels or one or more rails.

In a further aspect, the invention provides a system for performing operations on a wind turbine that involve handling heavy parts, the wind turbine comprising: a nacelle frame; the system comprising a first hoist substantially permanently mounted on the nacelle frame; a second hoist adapted to be hoisted on the nacelle frame by the first hoist; and a winch adapted to be hoisted on the nacelle frame by the second hoist; the winch suitable for handling a part selected from the group consisting of: a generator, a gearbox, and a transformer of the wind turbine. Preferably, the first hoist is mounted on a structure consisting of one or more wheels or one or more rails.

The invention also provides a nacelle frame assembly for a wind turbine, the assembly comprising: a nacelle frame; a first hoist substantially permanently mounted on the nacelle frame; a second hoist which is appropriate for being hoisted to the nacelle frame by the first hoist and temporarily mounted on the nacelle frame for performing operations that involve handling heavy parts when the nacelle frame is arranged on a wind turbine. Preferably, the frame assembly further comprises a winch suitable for being hoisted and temporarily mounted on the nacelle frame for performing operations that involve handling a part selected from the group consisting of: a generator, a gearbox, and a transformer of the wind turbine when the nacelle frame is arranged on a wind turbine.

The invention makes use of three lifting mechanisms: first and second power hoists and a winch. In one particular case, the first hoist may be an overhead electric chain hoist, and more particularly an overhead electric single chain hoist. The second hoist may be a hook electric chain hoist and the winch maybe one selected from a birail electric wire rope hoist, a birail electric winch hoist, a running trolley winch hoist, or other suitable movable hoist.

The use of three lifting mechanisms, i.e., first power hoist, second power hoist, and winch, one more powerful than the other, makes the over-sizing of the first, permanently mounted hoist to be unnecessary. The first power hoist is a device which is mounted on each wind turbine. The method of the invention allows moderate weight pieces or assemblies to be efficiently handled and hoisted to and lowered from the nacelle. For obtaining a cost effective method, the permanently mounted first power hoist is not capable of hoisting the winch; therefore, an intermediate power hoist is used. If only two lifting mechanisms are employed, this would involve the first power hoist to be over-sized and consequently making the whole assembly and method capital intensive for each wind turbine. Power hoist and winch costs may be shared by a large number of wind turbines. Power hoists have low weight and small size so they can be hoisted all at once and handled reasonably comfortably within the space bound inside the nacelle frame and placed in the corresponding location without requiring assembling operations. Further, the use of three lifting mechanisms, the weight and size of power hoists, and placing them on tracks creates flexibility that even surpasses that of the large terrestrial and marine cranes. Numerous other features, objects, and advantages of the invention will become apparent from the following description when read in conjunction with the accompanying drawings.

BRIEF DESCRIPTION OF THE DRAWINGS

A particular embodiment of a system for handling parts in a wind turbine according to the present invention will be described in the following, only byway of non-limiting example, with reference to the appended drawings, in which.

DETAILED DESCRIPTION OF THE INVENTION

Figure 1:
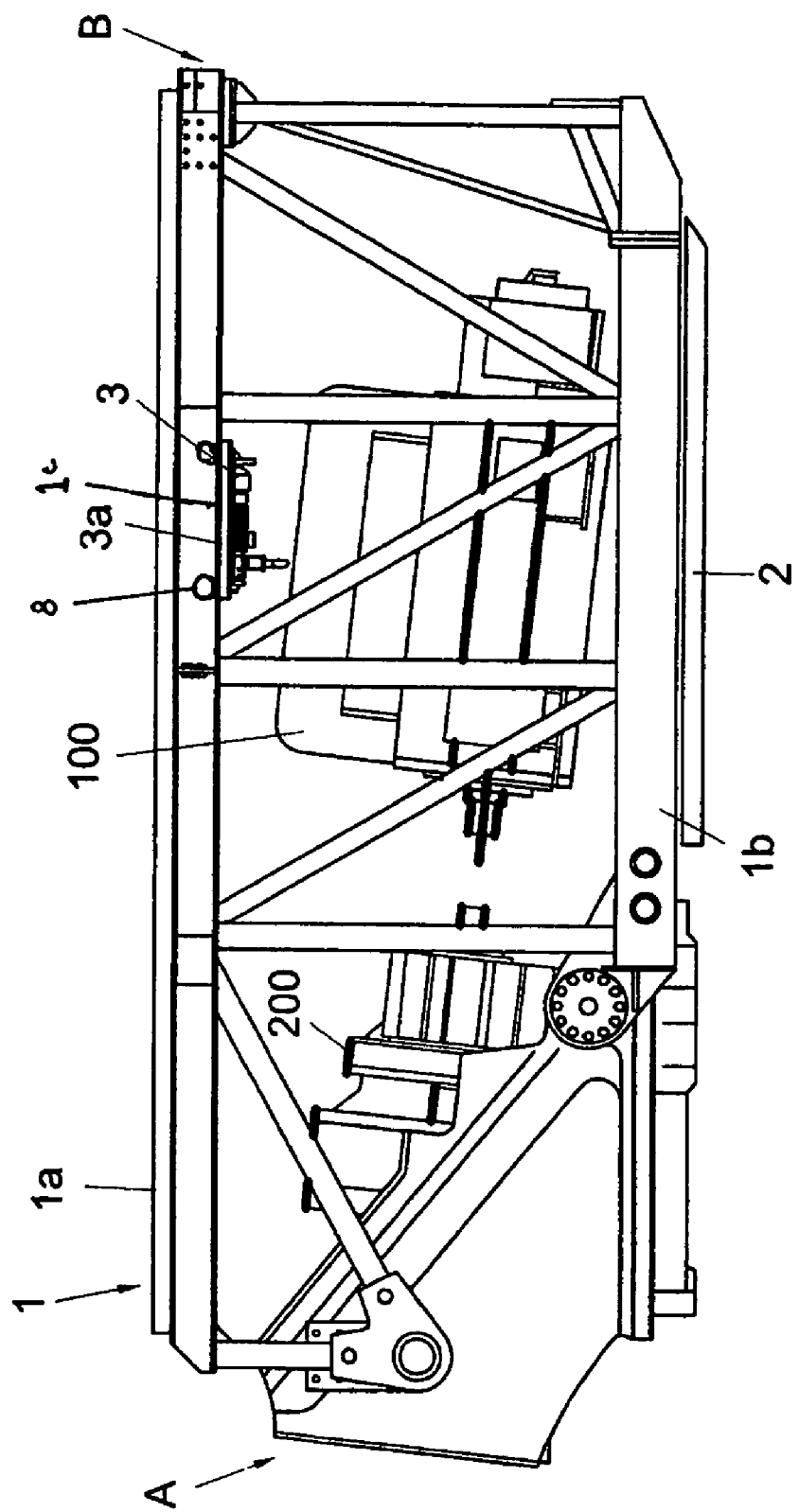
FIG. 1 is an elevational view of the preferred embodiment of a nacelle frame with a first hoist and exemplary heavy parts of a wind turbine therein which are to be repaired or replaced by using the system and the method of the invention.

A system for performing operations that involve handling heavy parts, such as a generator 100, a gearbox 200, or a transformer (not shown) on a wind turbine is shown in the figures herein attached. Such handling operations to be performed through the system that will be now described may be, for example, lowering and raising such parts 100, 200 (or other heavy parts in the wind turbine) for being either replaced or repaired.

A nacelle frame 1 is shown having a front portion A where the wind blades of the wind turbine (not shown) are arranged, and a rear portion B opposite the front portion A.

The nacelle frame 1 is formed with a metal structure having upper section members or rails 1a and lower section members 1b. A lower opening 2 is formed in the lower section member 1b so that at least some of the heavy the parts 100, 200, etc., of the wind turbine can be passed through the structure of the nacelle frame 1.

A first, lightweight hoist 3 is substantially permanently mounted on an upper portion of the nacelle frame 1 by means of a carriage 3a. Preferably, hoist 3 is movable, preferably either on one or more wheels, such as 8, and or one or more rails, such as 1c. The first hoist 3 may be moved sideways in the carriage 3a, and the carriage 3a maybe moved lengthways along the upper portion of the nacelle frame 1, that is, in a horizontal direction that is perpendicular to the direction in which the devices are lifted from the ground so that it may be positioned substantially aligned above the opening 2 of the nacelle frame 1. The first hoist 3 is provided with cable 3b, and it is capable of raising parts on the order of 1,000 Kg. Here, "cable" is used in its broadest sense, and can be a rope or any other flexible hanger.

A second hoist 4 is further provided. This second hoist 4 is more powerful than the first hoist 3, and it is capable of raising heavier parts, on the order of 9,000 Kg. The cable 3b in the first hoist 3 is suitable for hoisting the second hoist 4. The second hoist 4 is removably mounted to rear portion B of the nacelle frame 1 of the wind turbine. The second hoist 4 comprises a drive chain 6d.

Figure 5:
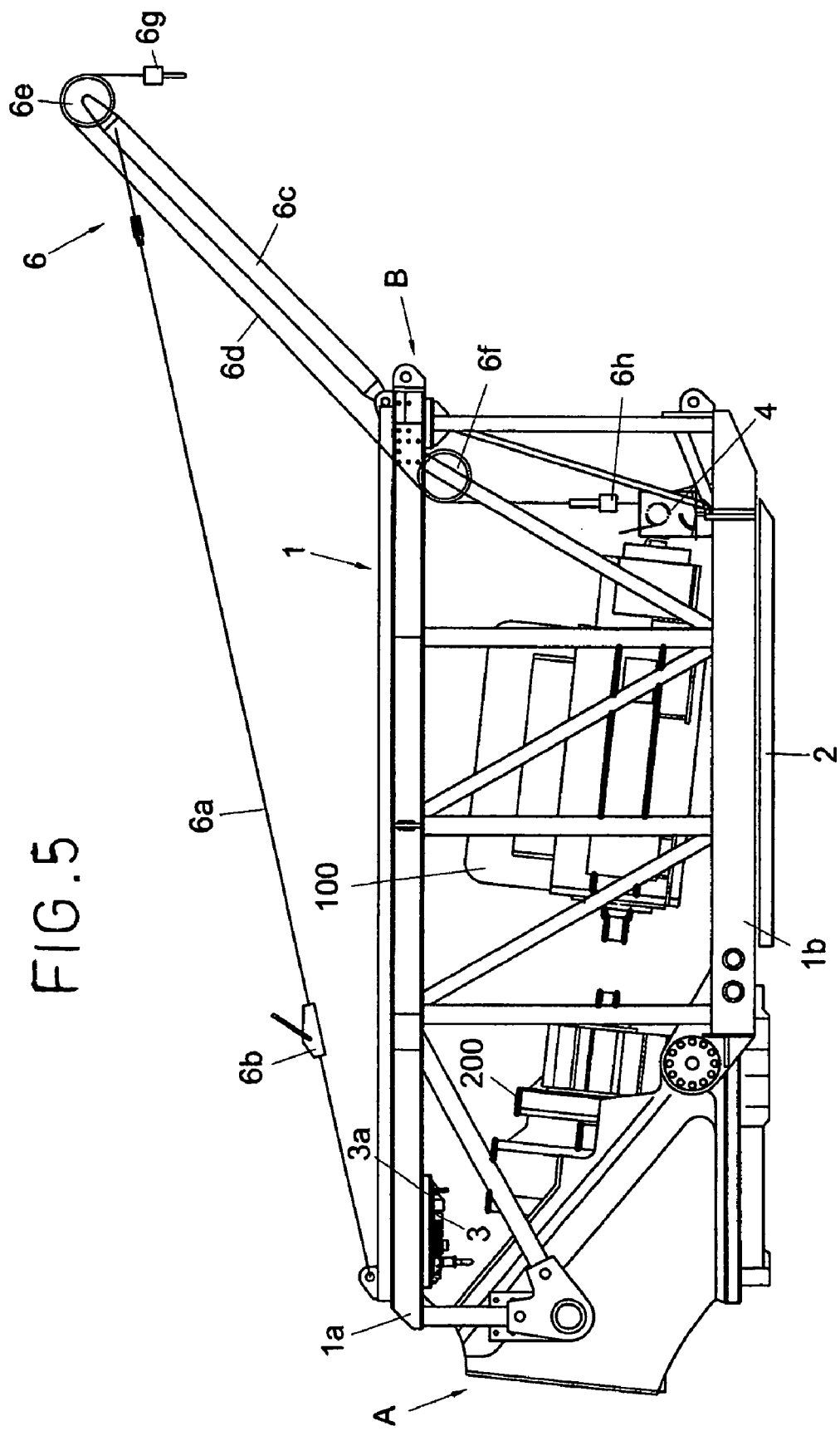
FIG. 5 is an elevational view of the nacelle frame of FIG. 1 showing a crane mounted at a working position on the frame.

A crane 6 (FIG. 5) is further provided at the rear portion B of the nacelle frame 1. The crane 6 has a tension wire 6a, one end of which is connected to the front portion A of the nacelle frame 1. The tension wire 6a is provided with tensioner 6b, such as, for example, a tooth and pawl mechanism for adjusting tension in the tension wire 6a. The crane 6 further includes a crane arm 6c mounted on the rear portion of the nacelle frame 1, and it carries the chain 6d of the second hoist 4 running between pulleys 6e, 6f. One end 6g of the chain 6d is adapted for hoisting a winch 5b, the other end 6h thereof being connected to the second hoist 4.

The winch 5b has a still higher weight capacity, such as on the order of 30,000 Kgs. It is movable, preferably utilizing one or more wheels, such as 9, and/or one or more rails, such as 1a. It comprises a carriage structure 5a adapted for being attached to the rear portion B of the nacelle frame 1, and a wire rope reel 5b for hoisting the parts 100, 200. Winch 5b, carriage 5a, and coupling structures 5c and 5d form a winch assembly 5. The winch 5b preferably is adapted for being moved along the rails 1a of the nacelle frame 1, as explained below. The coupling structures 5c and 5d facilitate the coupling of the winch to the nacelle frame in a manner that facilitates its movement onto rails 1a.

The method for handling the parts 100, 200 in the wind turbine by means of the above-described system is as follows.

Figure 2:
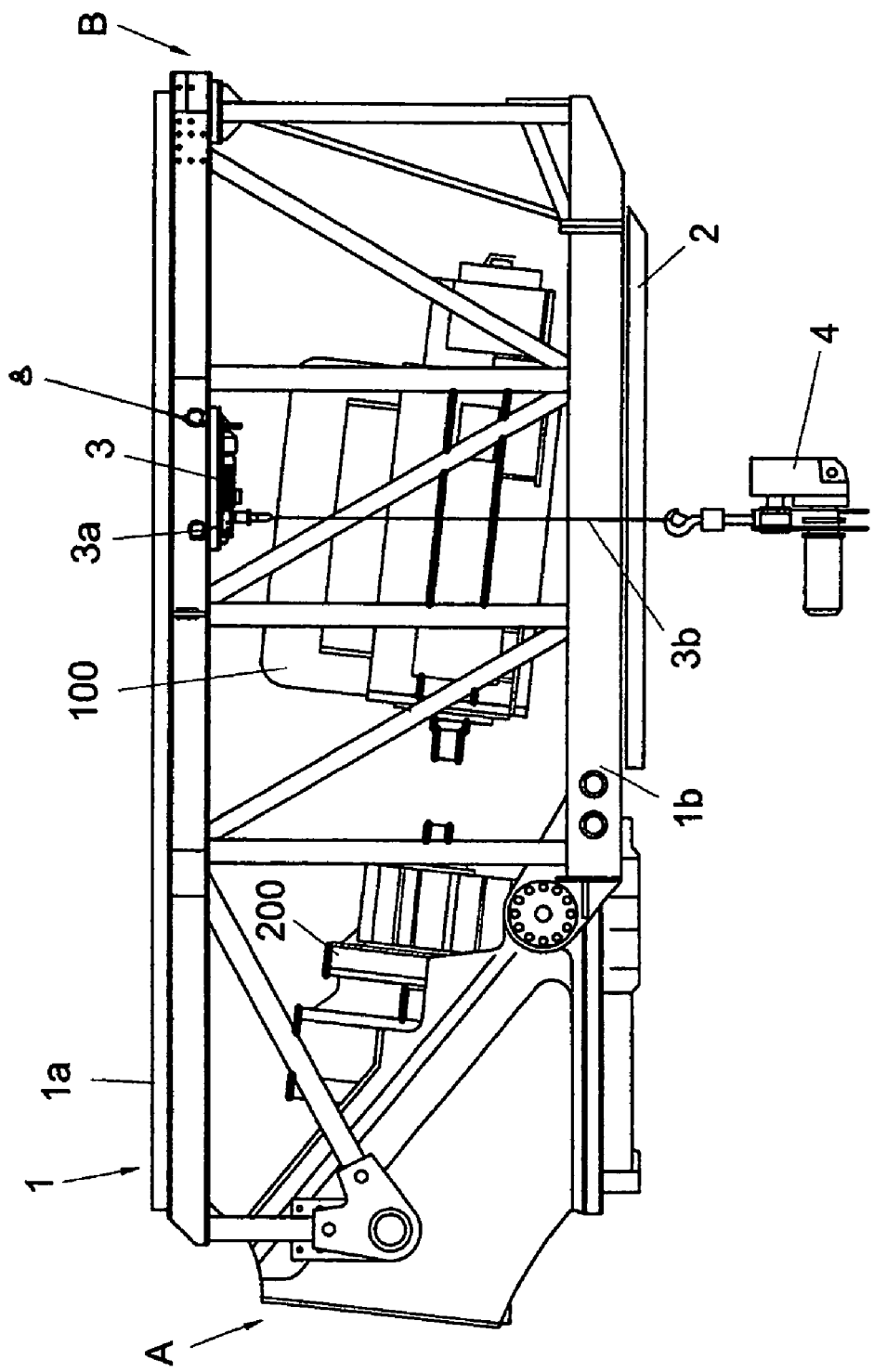
FIG. 2 is an elevational view of the nacelle frame of FIG. 1 showing a second hoist being lifted by the first hoist.
Figure 3:
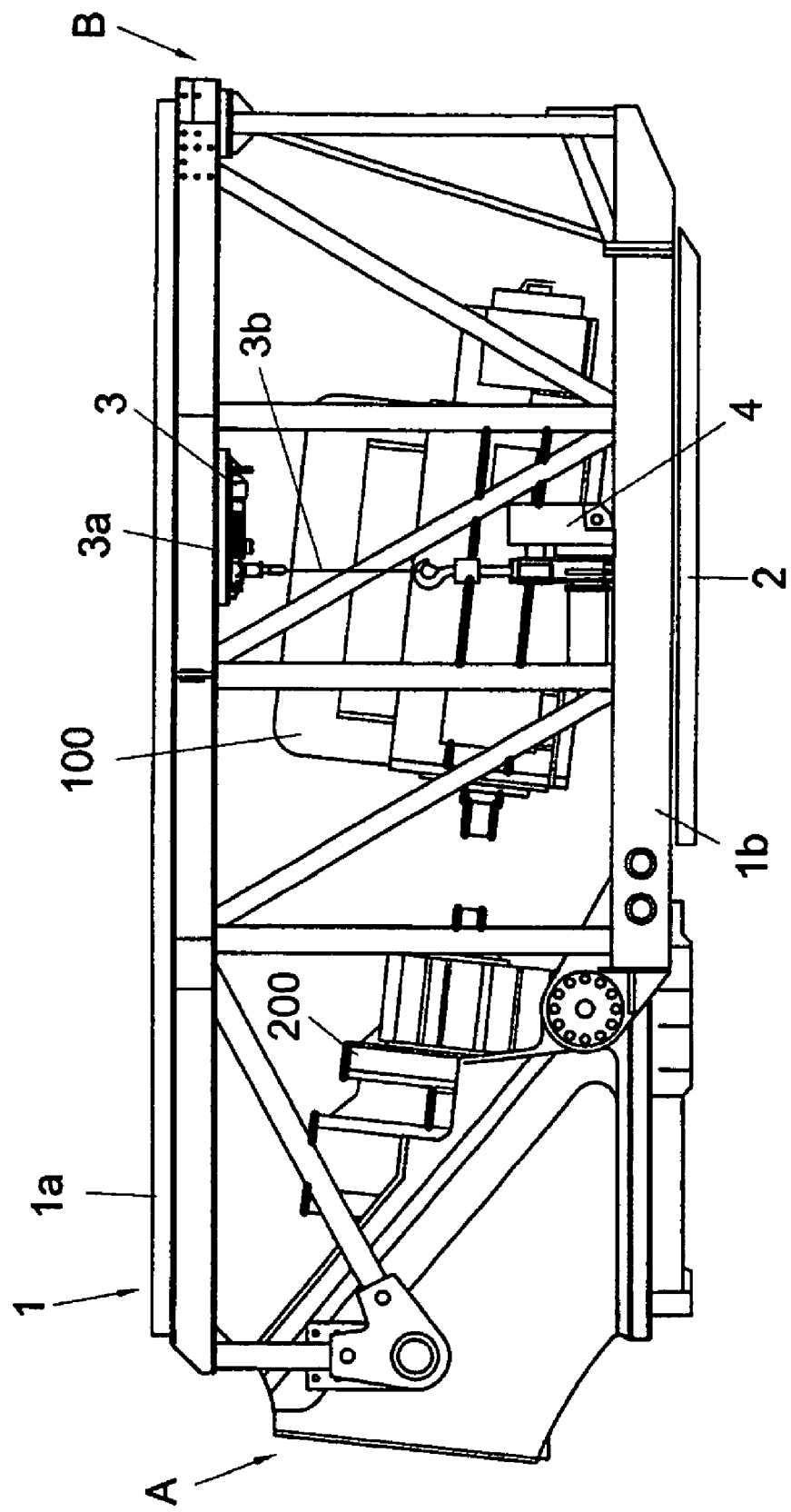
FIG. 3 is an elevational view of the nacelle frame of FIG. 1 showing the second hoist lifted to the nacelle frame.
Figure 4:
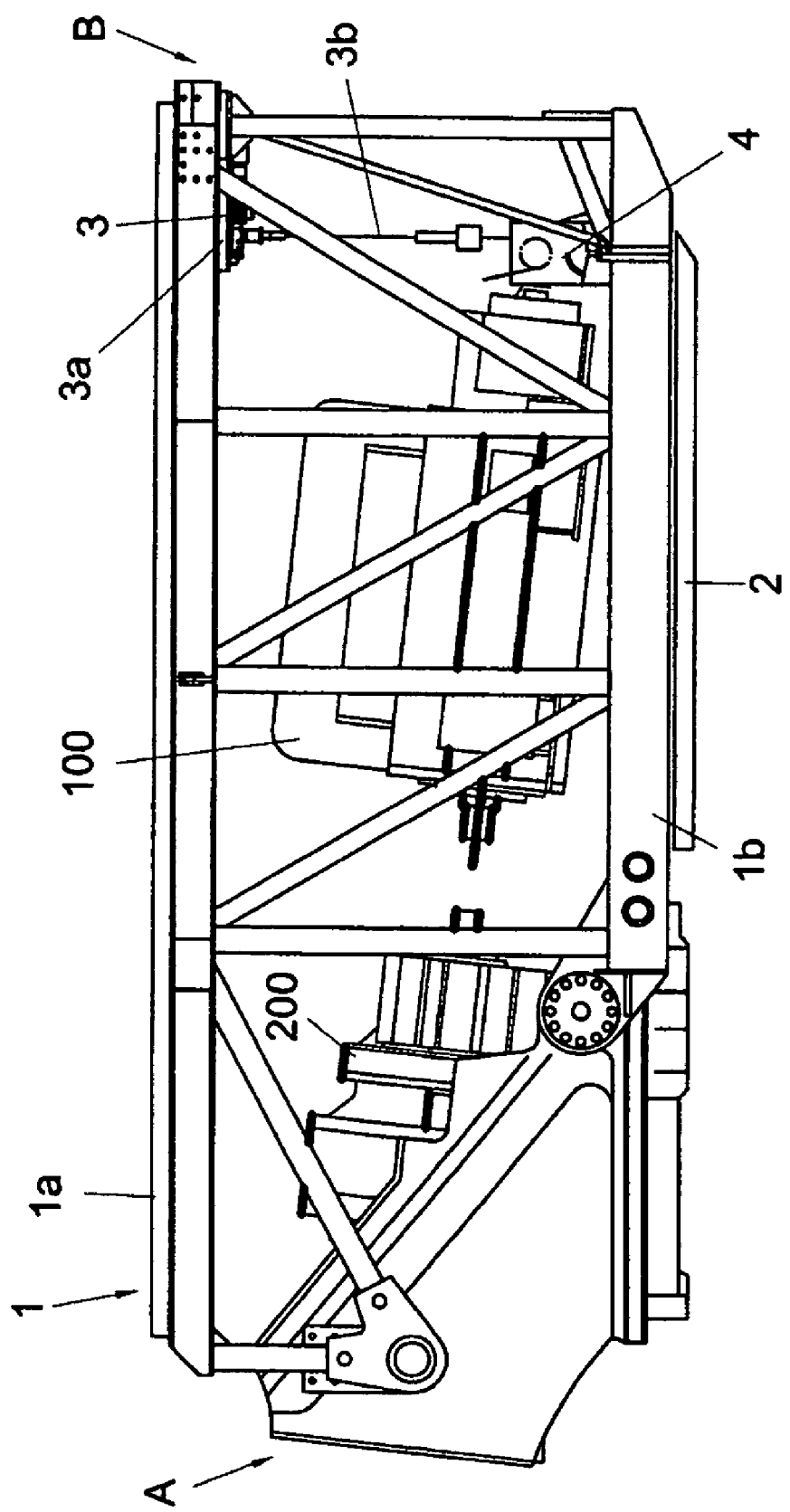
FIG. 4 is an elevational view of the nacelle frame of FIG. 1 showing the second hoist lifted being moved to a working position on the frame.

For lowering, for example, the generator 100 from the nacelle frame 1 according to the method of the invention, the first power hoist 3 hoists the second power hoist 4 (see FIG. 2) and the crane 6 from the workplace ground. Both the second power hoist 4 and the crane 6 are mounted at the rear portion B of the nacelle frame 1 (see FIGS. 4 and 5). In this regard, the second power hoist 4 is passed through the frame opening 2 and then moved to the rear portion B of the nacelle frame 1.

Figure 6:
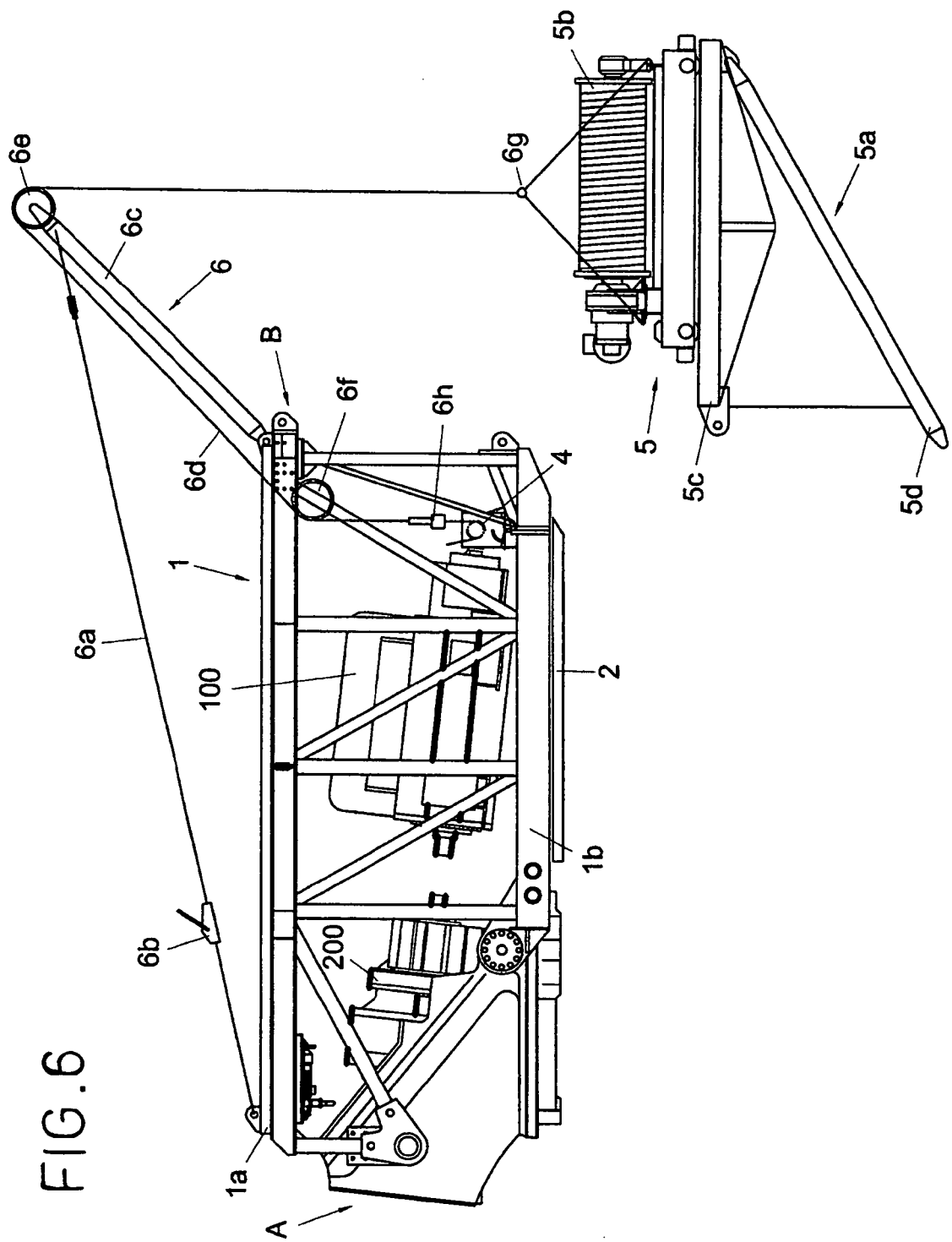
FIG. 6 is an elevational view of the nacelle frame of FIG. 1 showing the crane lifting a winch assembly.
Figure 7:
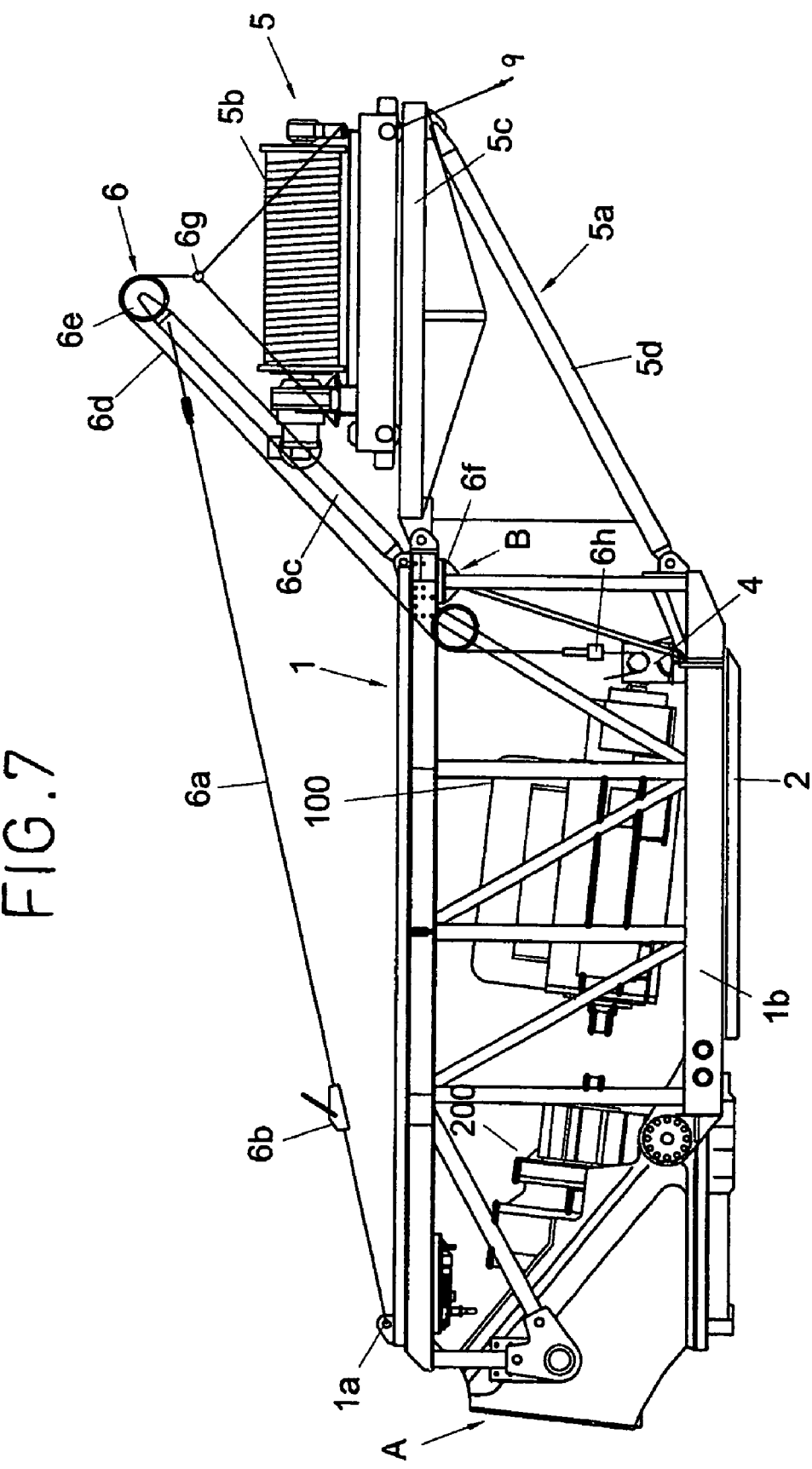
FIG. 7 is an elevational view of the nacelle frame of FIG. 1 showing the winch assembly secured to the nacelle frame.

The crane 6, cooperating with the second hoist 4, hoists the winch assembly 5 (see FIG. 6) to the nacelle frame 1 until the coupling structure, preferably comprising two connecting arms 5c, 5d of the winch assembly 5, face the rear portion B of the structure of the nacelle frame 1 (see FIG. 7). The carriage structure 5a of the winch assembly 5 then becomes removably attached to this rear portion B of the nacelle frame 1. It is to be noted that in other embodiments of the method herein described according to the invention the winch assembly 5 is directly hoisted by the second power hoist 4 to the nacelle frame 1.

Figure 8:
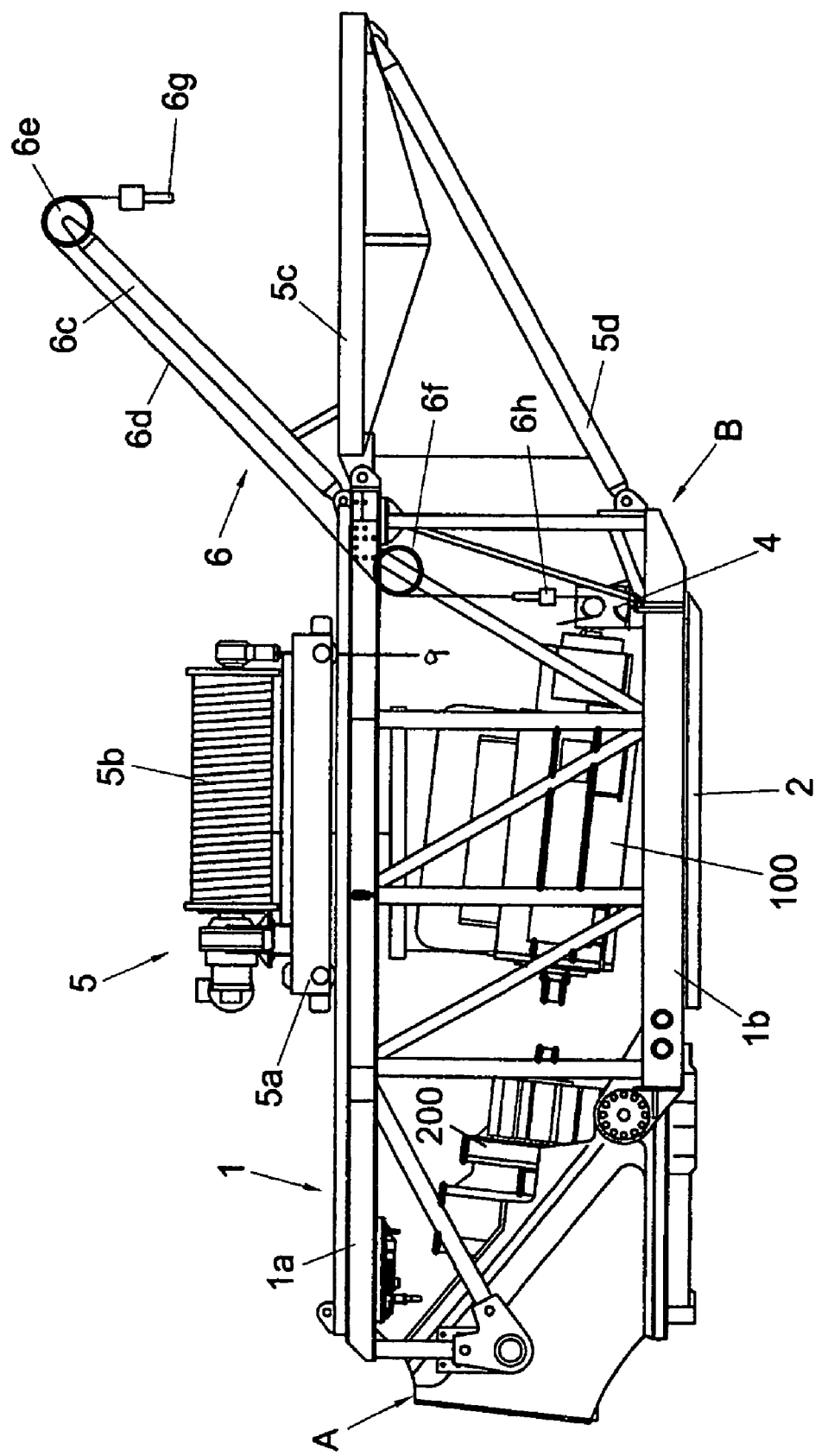
FIG. 8 is an elevational view of the nacelle frame of FIG. 1 showing the winch moved to a working position.

Once the winch 5b has been already removably mounted to the frame rear portion B, it is disengaged from its coupling structures 5c, 5d and moved over the upper section members 1a from the rear portion B to the front portion A of the nacelle frame 1 until it becomes substantially aligned with the opening 2 as shown in FIG. 8.

Therefore, three lifting mechanisms are used: a first power hoist 3, a second hoist 4, which is preferably a chain power hoist 4, and a winch 5b, all of them preferably electric and all working in sequence. The winch 5b will be used to handle the heavy parts (such as the generator 100) of the nacelle frame 1. In the claimed method, one hoist is hoisted by another hoist.

Figure 9:
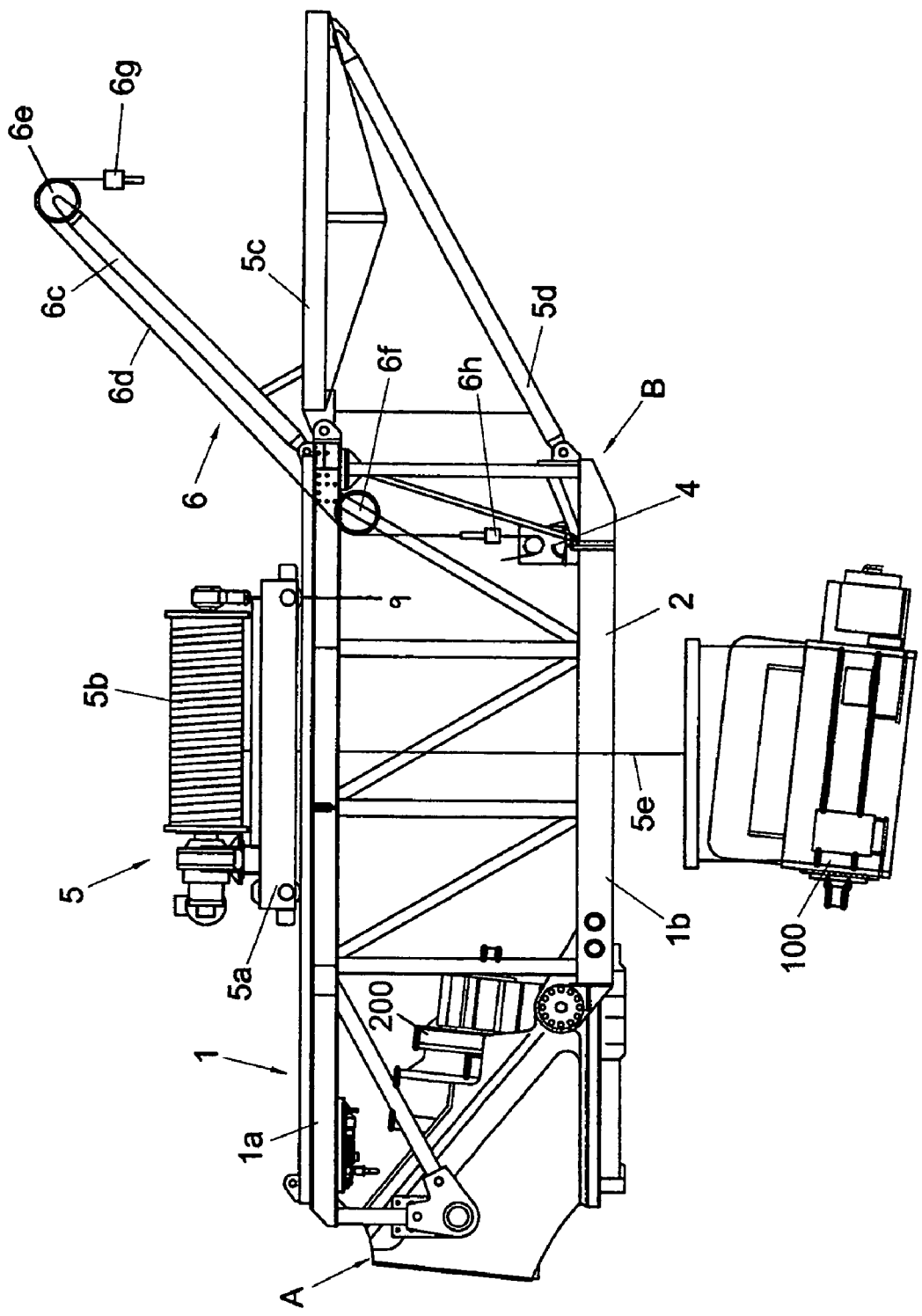
FIG. 9 is an elevational view of the nacelle frame of FIG. 1 showing the winch lifting a heavy portion of the turbine.

The generator 100 is then coupled to one end of the wire rope 5e of the winch 5b and it is lowered to the ground so that a new or repaired generator 100 is hoisted again to the nacelle frame 1, as shown in FIG. 9.

Once the new or repaired generator 100 has been fitted in the wind turbine, the winch assembly 5, the second hoist 4, and the crane 6 are disconnected from the nacelle frame 1 and lowered from the nacelle frame 1.

The above-described method for handling operations may also be employed for raising and lowering other heavy parts in a wind turbine, such as, for example, the gearbox 200 and the transformer (not shown).

As previously described, the heavy the parts 100, 200 to be handled are passed through the opening 2 so that there is not required a completely open deck for handling operations. It is only necessary that a small central fringe in the nacelle frame deck be provided for allowing the winch hoisting cable to be passed through. The hoist 3 is movable and preferably runs on wheels and/or one or more integrally formed rails 1a which permits the hoist 2 to be placed anywhere on the nacelle frame. The winch 5b also runs through rails 1a that are formed integrally with the nacelle frame 1 and fitted externally to the nacelle frame deck Therefore, it is not necessary to open the whole nacelle frame deck so that the winch 5b can be displaced.

There has been described a method of handling heavy objects associated with a wind turbine that is cost effective and flexible. It should be understood that the particular embodiments shown in the drawings and described within this specification are for purposes of example and should not be construed to limit the invention, which will be described in the claims below. Further, it is evident that those skilled in the art may now make numerous uses and modifications of the specific embodiments described, without departing from the inventive concepts. Equivalent structures and processes may be substituted for the various structures and processes described; the subprocesses of the inventive method may, in some instances, be performed in a different order; or a variety of different materials and elements may be used. Consequently, the invention is to be construed as embracing each and every novel feature and novel combination of features present in and/or possessed by the heavy wind turbine parts handling system and method described.

The invention claimed is:

1. A method of providing heavy lift capability to a wind turbine having a nacelle frame and a first hoist substantially permanently mounted on said nacelle frame for maintenance operations, said method comprising:
    utilizing said first hoist to lift a second hoist on said nacelle frame, said second hoist capable of lifting a heavier load than said first hoist;
    mounting said second hoist on said nacelle frame;
    mounting a crane proximate a rear portion of said nacelle frame;
    utilizing said second hoist and said crane to lift a winch to said nacelle frame;
    mounting said winch to said nacelle frame; and,
    performing lifting and lowering operations with at least said winch that involve handling heavy parts of said wind turbine.

2. The method of claim 1, wherein mounting said crane on said nacelle frame is completed such that said crane is removable.

3. The method of claim 2, wherein mounting the winch on the nacelle frame is completed such that said winch is removable.

4. The method of claim 1, further comprising moving said first hoist along an upper section member of said nacelle frame.

5. The method of claim 4 wherein said moving said first hoist comprises moving on one or more wheels or one or more rails along said upper section member.

6. The method of claim 5 wherein said winch is hoisted on said nacelle frame together with a coupling structure for mounting said winch to said nacelle frame.

7. The method of claim 1, further comprising moving said winch along an upper section member of said nacelle frame.

8. The method of claim 7 wherein said moving said winch comprises moving on one or more wheels or one or more rails along said upper section member.

9. The method of claim 1, wherein said winch is capable of lifting heavier parts of said wind turbine than said first or second hoists.

10. The method of claim 1, further comprising removing and lowering said winch from said nacelle frame.

11. The method of claim 10, further comprising removing and lowering said crane from said nacelle frame.

12. A method for performing operations on a wind turbine that involve handling heavy parts, said wind turbine comprising a nacelle frame with a first hoist permanently mounted on said nacelle frame such that said first hoist is capable of moving in at least a lengthways direction along said nacelle frame, said method comprising:
    lifting a second hoist to said nacelle frame using said first hoist, said second hoist capable of lifting a heavier load than said first hoist;
    mounting said second hoist on said nacelle frame;
    hoisting a cable winch on the nacelle frame by said second hoist;
    mounting said winch on said nacelle frame such that said winch is capable of moving along said nacelle frame parallel to said first hoist;
    performing operations with said winch that involve handling said heavy parts of said wind turbine;
    removing and lowering said winch from said nacelle frame using said second hoist; and
    removing said second hoist from said nacelle frame and lowering said second hoist using said first hoist.

13. The method of claim 12, further comprising moving at least one of said first hoist and said winch along said nacelle frame on one or more wheels or one or more rails.

14. A system for performing operations on a wind turbine nacelle frame comprising:
    a first hoist substantially permanently mounted along an upper section member of said nacelle frame; and,
    a second hoist adapted to be positioned along a lower section member of said nacelle frame by said first hoist;
    wherein said first hoist can translate in at least one direction relative to said second hoist.

15. The system of claim 14, wherein said first hoist is mounted on a structure consisting of one or more wheels or one or more rails along said upper section member of said nacelle frame.

16. The system of claim 14, wherein a winch is adapted to be hoisted to said upper portion of said nacelle frame by said second hoist, said winch suitable for handling one or more parts of said wind turbine selected from the group comprising: a generator, a gearbox, and a transformer of said wind turbine.

17. A nacelle frame assembly for a wind turbine comprising:
    a nacelle frame having an upper section member and a lower section member;
    a first hoist substantially permanently mounted along said upper section member, said first hoist capable of movement along said upper section member;
    a second hoist temporarily mounted along said lower section member of said nacelle frame;
    a crane temporarily positioned at a rear portion of said nacelle frame and coupled to said second hoist; and,
    a winch temporarily mounted along said upper section member of said nacelle frame;
    wherein said winch is used to move heavy wind turbine parts to and from said nacelle frame.

18. The nacelle frame assembly of claim 17, wherein said winch is capable of movement along one or more rails of said upper section member.

* * * * *